US009275363B2

(12) United States Patent  (10) Patent No.: US 9,275,363 B2
Maleeny et al.  (45) Date of Patent: Mar. 1, 2016

(54) APPARATUS, SYSTEMS, AND METHODS TO FACILITATE THE INTERACTION BETWEEN PARTIES

(76) Inventors: Robert Cary Maleeny, Ramsey, NJ (US); Robert Lowry Goulet, Orlando, FL (US)

( * ) Notice: Subject to any disclaimer, the term of this patent is extended or adjusted under 35 U.S.C. 154(b) by 619 days.

(21) Appl. No.: 13/171,202

(22) Filed: Jun. 28, 2011

(65) Prior Publication Data

US 2012/0259769 A1  Oct. 11, 2012

Related U.S. Application Data

(63) Continuation of application No. 12/001,847, filed on Dec. 13, 2007, now abandoned.

(60) Provisional application No. 60/874,916, filed on Dec. 14, 2006.

(51) Int. Cl.
*G06Q 10/00* (2012.01)
*G06Q 30/00* (2012.01)
*G06Q 10/10* (2012.01)

(52) U.S. Cl.
CPC ..................................... *G06Q 10/10* (2013.01)

(58) Field of Classification Search
CPC .................. G06F 17/30867; G06F 17/30864; G06F 17/30598; G06F 17/30; H04L 67/306; H04L 67/22; H04L 51/32; H04L 12/588
USPC ......................................................... 709/206
See application file for complete search history.

(56) References Cited

U.S. PATENT DOCUMENTS

| 7,567,977 | B1 * | 7/2009 | White ..................... G06Q 10/10 |
| 2002/0194049 | A1 * | 12/2002 | Boyd .................. G06Q 10/109 |
| | | | 709/204 |
| 2004/0210661 | A1 * | 10/2004 | Thompson ..................... 709/228 |
| 2004/0215793 | A1 * | 10/2004 | Ryan ...................... G06Q 50/01 |
| | | | 709/229 |
| 2005/0216300 | A1 * | 9/2005 | Appelman et al. ................ 705/1 |
| 2006/0042483 | A1 * | 3/2006 | Work ..................... G06Q 10/00 |
| | | | 101/91 |
| 2006/0053158 | A1 * | 3/2006 | Hall ........................ G06F 21/10 |
| 2006/0143214 | A1 * | 6/2006 | Teicher ......................... 707/101 |
| 2006/0161599 | A1 * | 7/2006 | Rosen ........................... 707/201 |
| 2006/0229902 | A1 * | 10/2006 | McGovern ............. G06Q 10/06 |
| | | | 705/321 |
| 2007/0038594 | A1 * | 2/2007 | Goodwin ............... G06Q 10/10 |
| 2007/0106627 | A1 * | 5/2007 | Srivastava et al. .............. 706/20 |
| 2007/0121826 | A1 * | 5/2007 | Sako .................... H04M 1/7253 |
| | | | 379/88.21 |
| 2007/0121843 | A1 * | 5/2007 | Atazky .................. H04L 12/588 |
| | | | 379/114.13 |
| 2007/0265865 | A1 * | 11/2007 | Cox ....................... G06Q 10/00 |
| | | | 705/321 |
| 2008/0016103 | A1 * | 1/2008 | Hall ........................ G06F 21/10 |

(Continued)

*Primary Examiner* — Wutchung Chu
(74) *Attorney, Agent, or Firm* — Myers Wolin, LLC

(57) ABSTRACT

Devices, systems and methods for facilitating interactions between individuals are disclosed. The exemplary method may include providing member facility information and allowing other members to review the facility information. Members may request a meeting with another member with details of the requested meeting via the system. The request is transmitted to another member and the other member may accept, deny, or modify the request by the other member. Members may have an other members inclusive list or other members exclusive list to assist in facilitating interactions. Ratings may be used to rate other members and interaction facilities to aid in facilitating future interactions.

7 Claims, 13 Drawing Sheets

(56) References Cited

U.S. PATENT DOCUMENTS

| | | | |
|---|---|---|---|
| 2008/0120261 A1* | 5/2008 | John | G06N 5/02 706/45 |
| 2008/0120361 A1* | 5/2008 | Pagan | H04L 67/104 709/203 |
| 2009/0204507 A1* | 8/2009 | Cockayne | G06N 5/02 705/26.1 |
| 2009/0259441 A1* | 10/2009 | Yoshikai | G06Q 10/10 703/1 |
| 2010/0174784 A1* | 7/2010 | Levey | H04L 51/34 709/206 |
| 2010/0211427 A1 | 8/2010 | Morelli et al. | |
| 2010/0223134 A1* | 9/2010 | Lunenfeld | G06F 17/30864 705/14.54 |
| 2011/0082794 A1* | 4/2011 | Blechman | G06F 19/322 705/50 |

* cited by examiner

APPARATUS, SYSTEMS, AND METHODS TO FACILITATE THE INTERACTION BETWEEN PARTIES

CROSS REFERENCE TO RELATED APPLICATIONS

This application claims priority to U.S. Provisional Patent Application No. 60/874,916 filed Dec. 14, 2006 entitled "System and methods to facilitate the interaction between entities", and application Ser. No. 12/001,847 filed Dec. 13, 2007, which are incorporated fully herein by reference.

FIELD OF THE INVENTION

The present invention relates generally to facilitating private interactions, and more particularly to evaluating and presenting interactions between parties privately.

BACKGROUND OF THE INVENTION

Social and recreational clubs and private facilities may limit access to individuals who are members. Individuals may desire to experience other private clubs and facilities where they are not members, as well as meet other individuals. Members of clubs may also wish to invite guests to share in the enjoyment of clubs and facilities to which they members, as well as make new acquaintances.

Identifying individuals who are compatible with each other may be difficult and time consuming. Identifying other individuals that may have compatible interests may be socially awkward. In addition, providing personal information puts members at risk both physically and emotionally. Face-to-face meetings between individuals also inhibit meaningful feedback that may assist individuals in future interactions.

Accordingly, an efficient and effective apparatus, system and method is needed for assisting individuals in identifying possible compatible individuals without the need to divulge sensitive information or require prior personal contact. The systems and method may allow individuals to identify clubs and facilities of interest and share their experiences, or interaction at clubs and facilities. In addition, systems and methods may allow for feedback as well as allow other individuals to provide input in order to facilitate future interactions with compatible individuals.

SUMMARY OF THE INVENTION

It is, therefore, an objective of the present invention to provide devices, systems, and methods for facilitating interactions between individuals. The exemplary method may include providing information about a first facility by a member of the first facility and reviewing information about a second facility provided by a member of the second facility. The member of the first facility may request a meeting of the member of the second facility with details of the requested meeting. The requested meeting is transmitted to the member of the second facility. The member of the second facility may accept, deny, or modify the requested meeting. The response is transmitted back to the member of the first facility.

According to an exemplary embodiment of the present invention, the device may incorporate the following embodiments. In one embodiment, a member may put other members on their inclusive list or exclusive list. In another embodiment, members may rate the interaction and/or facility. In another embodiment, the first facility and second facility are private member only clubs or association. In yet another embodiment, the member of the first facility may be matched with the member of the second facility based exclusively on the membership of the facilities, time of the requested meeting, and members not being on an exclusive membership list. In another embodiment, the actions are carried out via a web portal.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Each member may have several profiles, "reciprocation forms" and override tables which both facilitate the interaction of different parties and simultaneously safeguard each party's privacy. The methods and systems may be used to align people with the same demographics and characteristics. The methods and systems may be used to allow people to seek out others with the same demographics/characteristics privately. The tables in the database may include but are not limited to the following.

I. Member Profile

Contains information the member is willing to provide. Though some information may be required, more information may be voluntary. Each member may be informed that the more information they provide the better their chances of interaction may be.

II. Inclusive Preferences

The member indicates the traits of other members with whom he/she would most like to interact.

III. Exclusive Requirements

The member indicates the traits of other members with whom he/she would least like to interact.

IV. Inclusive Override Table (Friends List)

The member's list of other members from whom he/she will accept communications regardless of what is stated in II and III. (This list may grow over time as the members become more familiar with one another)

V. Exclusive Override Table (Not a Friend List)

The member's list of persons (other members) from whom he/she will not accept requests regardless of what is stated in II and III. (This may also grow over time as the members become more familiar with one another)

VI. Hosting Ratings

Each member has a rating table where other members they have hosted may rate them on a sliding scale and post comments.

VII. Guest Ratings

Each member has a rating table where other members of whom they have been a guest may rate them on a sliding scale and post comments.

VIII. Clubs and Facilities

Contains name, location, directions, ratings, scorecards, etc. for but not limited to restaurants, nightclubs, country clubs, yacht clubs, golf clubs, hunting clubs, fishing clubs, ski clubs, flying clubs, racing clubs and resorts. Facilities and clubs also includes organizations and private membership information about an individuals.

IX. Member Calendar

Contains information about events specific to the member and may also include general events. May or may not be accessed by other members. Member may allow partial or limited access.

Process

Figure 1:
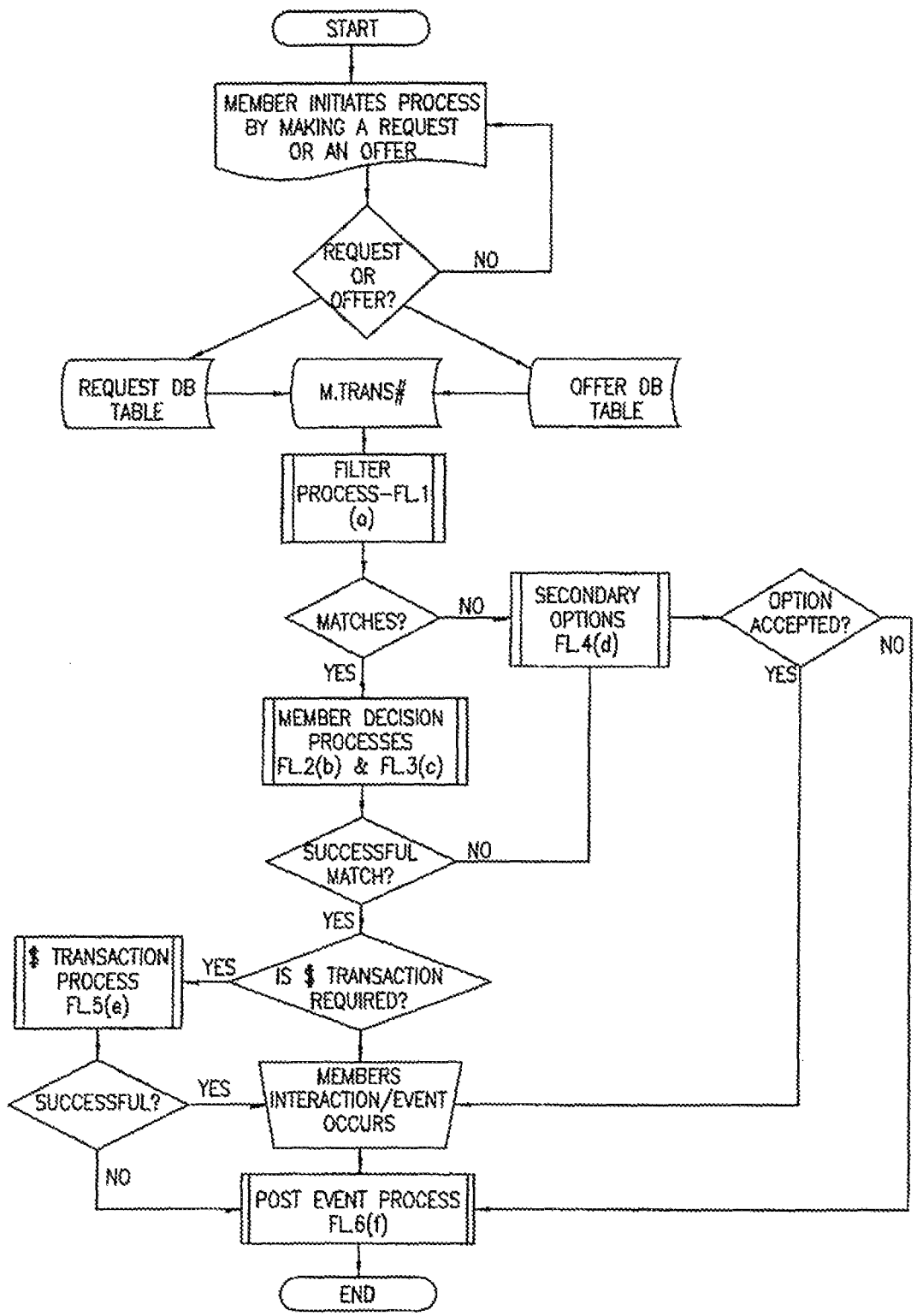
FIG. 1 is a flow chart illustrating a general overview of the interaction process between members according to a first exemplary embodiment of the present invention.
Figure 2A:
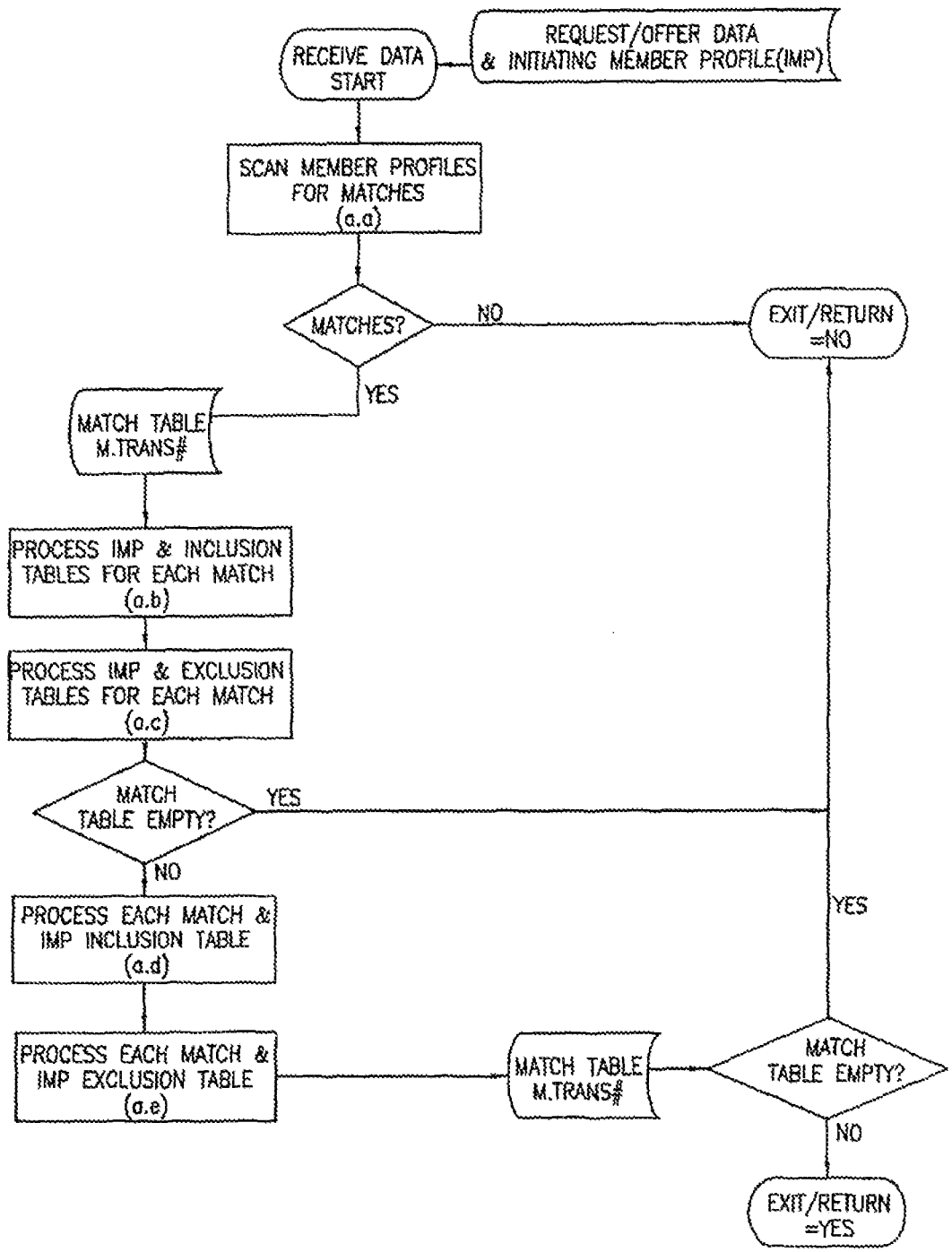
FIGS. 2A-C are flow charts illustrating a general overview of searching members for possible interactions according to a second exemplary embodiment of the present invention.
Figure 2B:
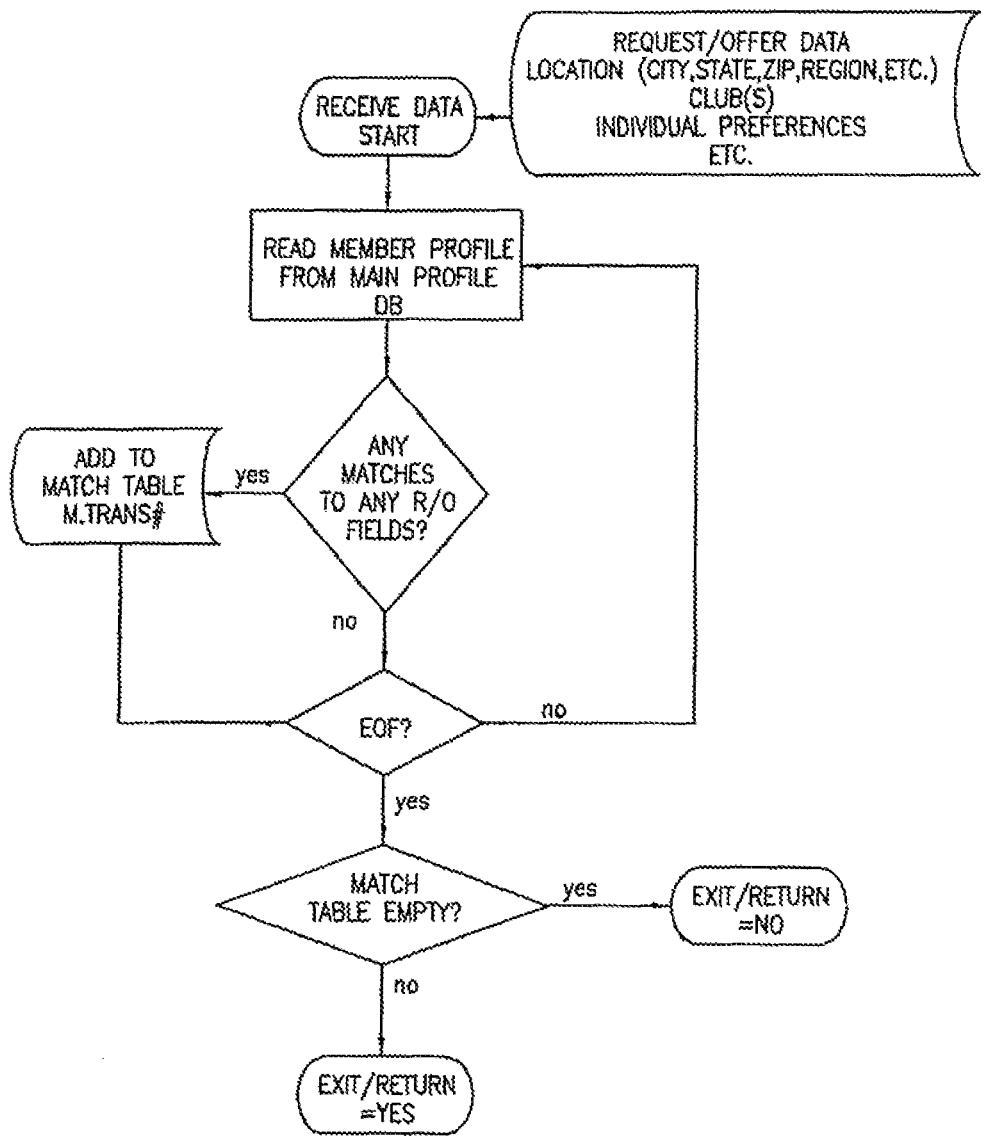
Figure 2C:
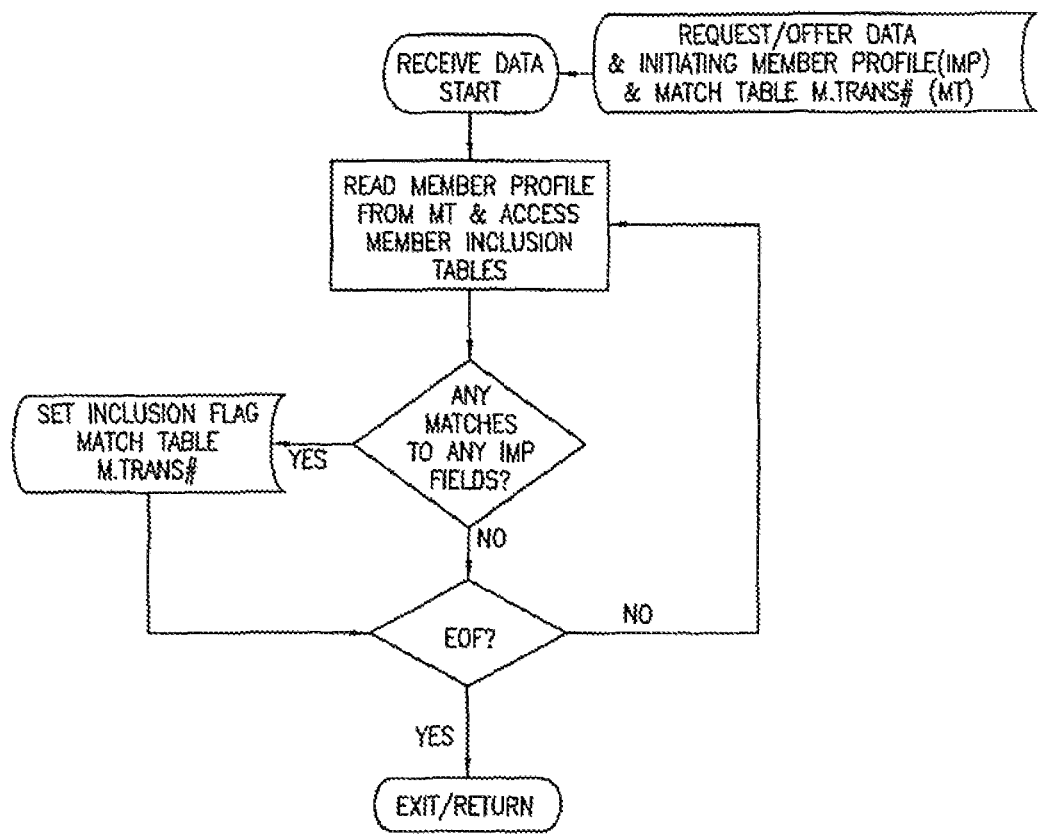
Figure 3:
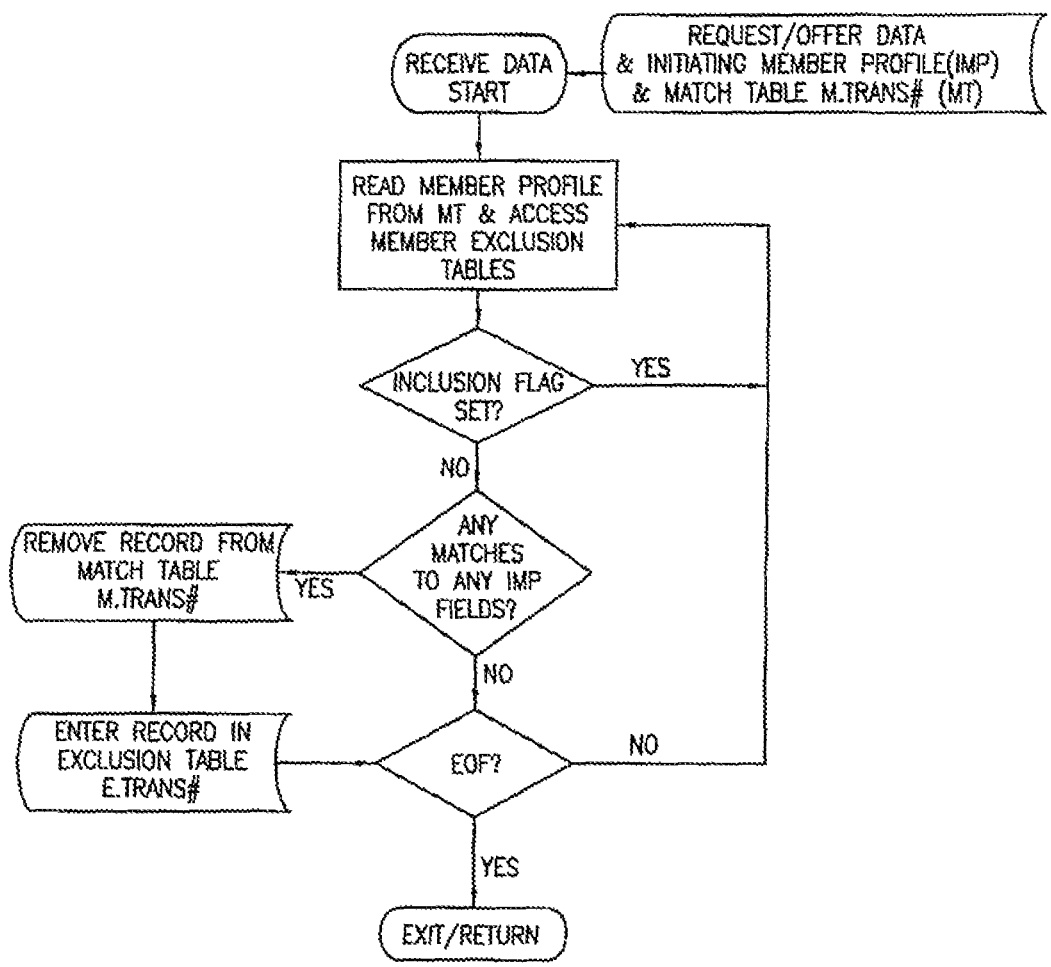
FIG. 3 is a flow chart illustrating a general overview of the exclusion of members according to a third exemplary embodiment of the present invention.
Figure 4:
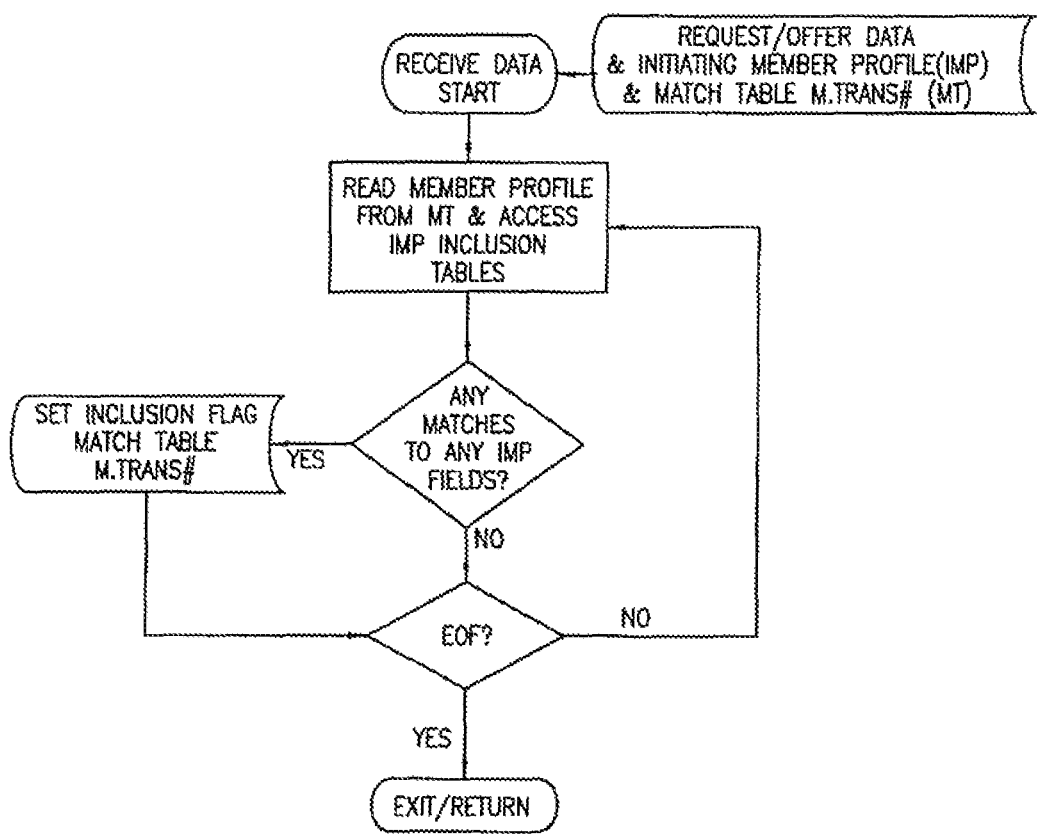
FIG. 4 is a flow chart illustrating a general overview of the inclusion of members according to a fourth exemplary embodiment of the present invention.

I. The member ("Initiating Member" or "IM") initiates the process by making a request as shown in FIGS. 1-2. This may be either a request for access to a club, facility, event, goods or services to be provided by another member or may be a like offer to another member. The request may comprise a pre-defined list of criteria or the member may specify criteria. Referring to FIGS. 3-4, the member may also choose to use their inclusive or exclusive preference tables or create new ones for this request (they may be less picky when pressed for time or on a trip or have a specific agenda).

Figure 5:
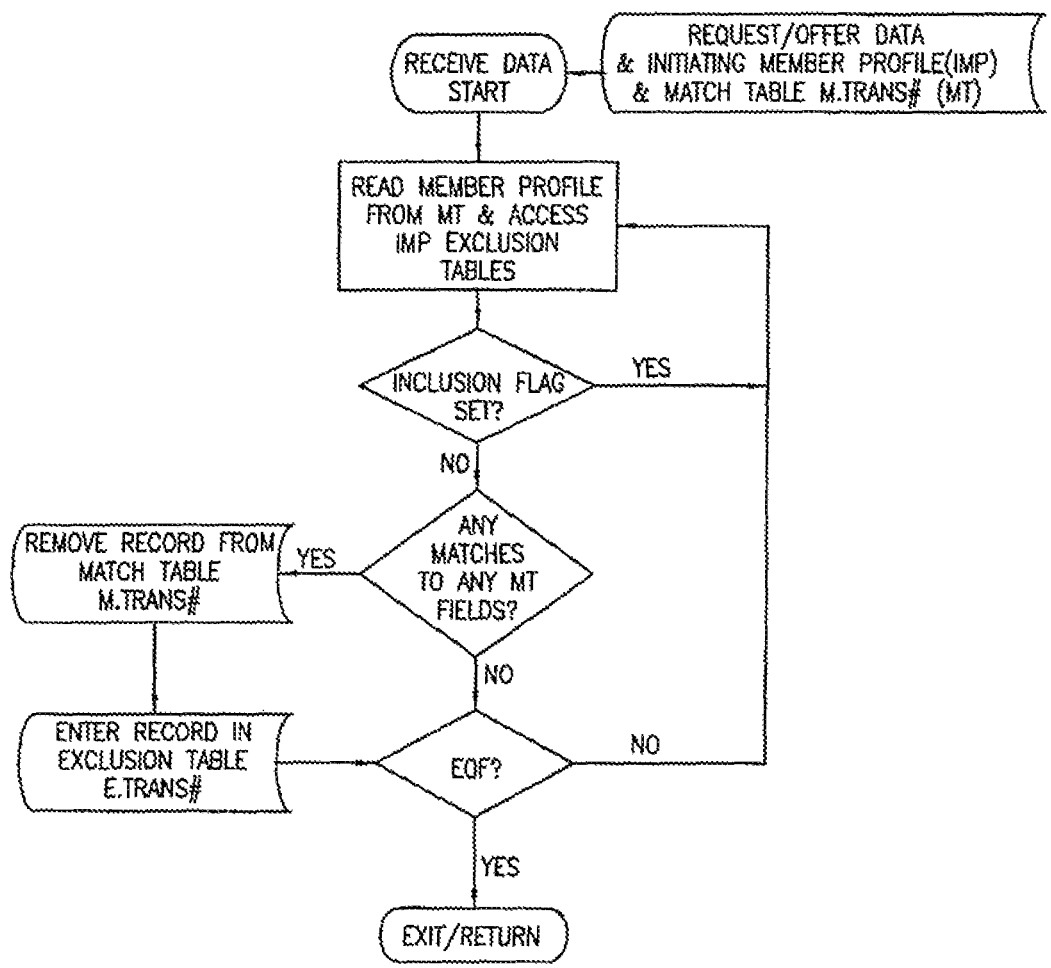
FIG. 5 is a flow chart illustrating a general overview of the matching of members according to a fifth exemplary embodiment of the present invention.

II. The request is "sifted" through the member database and the other members' profiles and tables and delivered to those who remain after the search as shown in FIG. 5. Attached to the request is the "public profile" of the member making the request or offer. This may include all or some of the required or voluntary profile information.

Figure 6A:
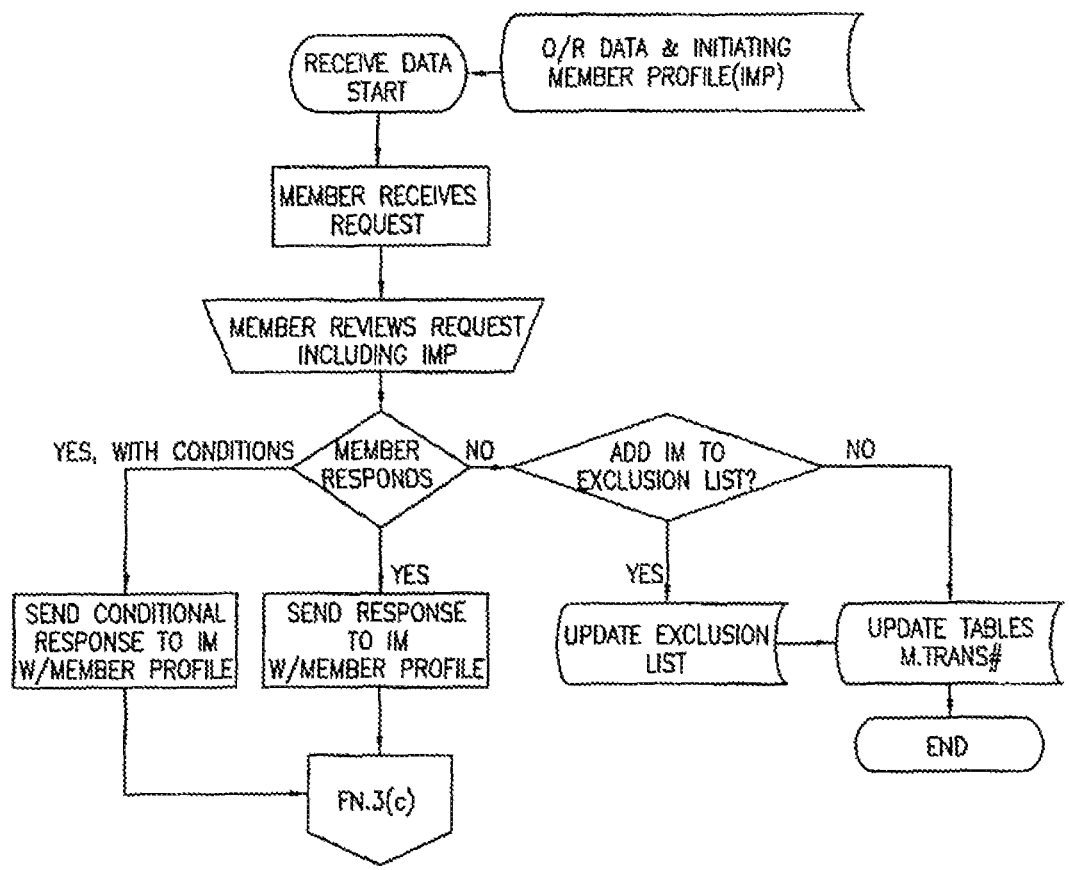
FIGS. 6A and 6B are flow charts illustrating a general overview of receiving a request and a response by a member according to a sixth exemplary embodiment of the present invention.
Figure 6B:
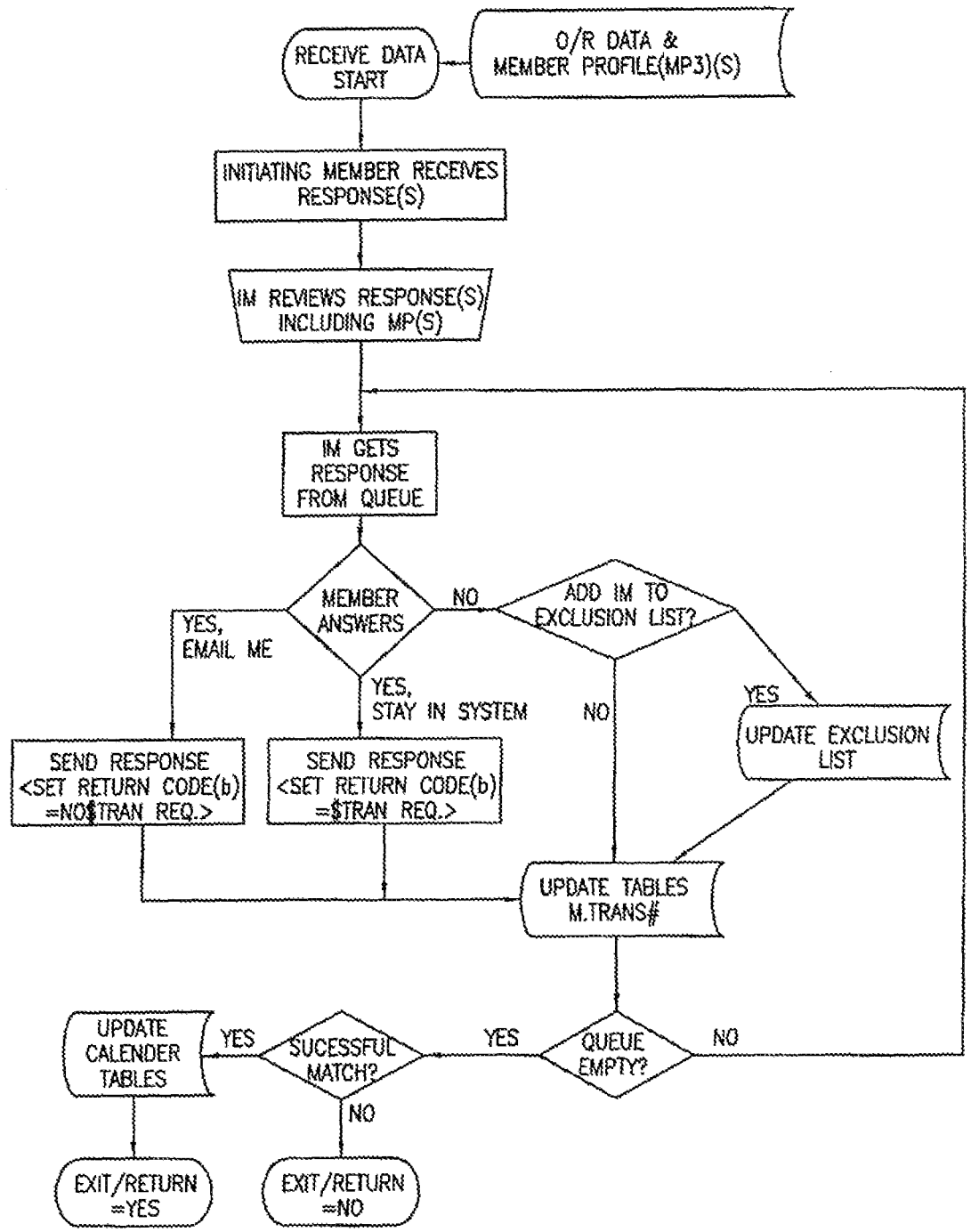
Figure 7:
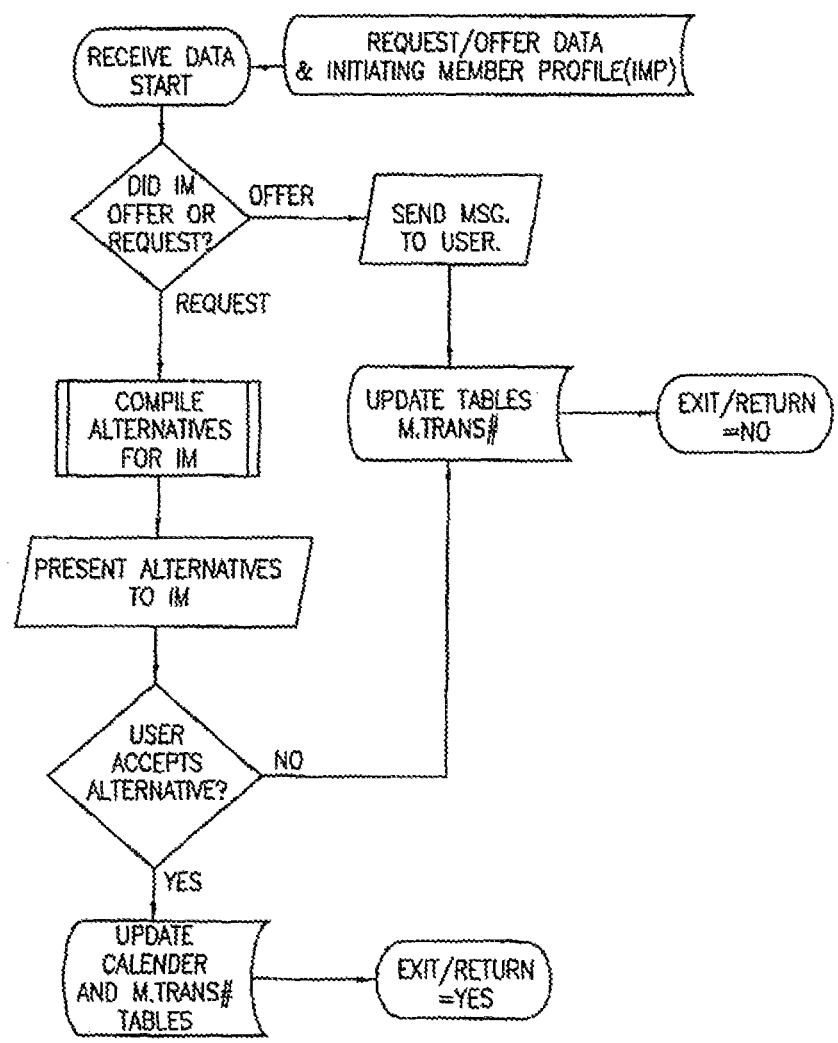
FIG. 7 is a flow chart illustrating a general overview of modifying the request according to a seventh exemplary embodiment of the present invention.

III. The member who receives the request the "Responding Member" or "RM") then has the following options as shown in FIGS. 6-7:
  A. Yes (response is sent back with RM public profile), RM member agrees to member's request/offer "as is". Move to step IV.
  B. Yes, but with modifications (response is sent back with RM public profile), RM agrees to a member's request/offer, but with some modifications. The RM profile may then be exchanged with the Initiating Member making the request.
  C. No (system takes no action except to update the appropriate log files for this transaction), the IM may or may not receive any information that their request/offer was denied.

Each request may be considered OPEN for a period of time. After a specified period of time has passed the system may then takes steps to deliver an opportunity for the initiating member to make a match. These may include but are not limited to:
  1. A message may be sent to the member offering other area clubs, facilities, events, goods or services that may be available. The message may contain links to the appropriate websites or additional information so the member can make an informed decision.
  2. A list may be offered for each available club, facility, event, goods or services in the area, if the member would like the system to check availability, the member may indicate which they would like to pursue. The system or personnel may then contact each in an attempt to accommodate the member's request.
  3. The system or personnel may attempt to contact the member to secure a club, facility, event, goods or services that fulfill the member's request.

D. Add to "Exclusive override table", the IM is added to the RM's exclusive override table. The IM may not receive any information that their request/offer was denied.

IV. Initiating member receives positive responses.

At this point the two members are able to directly contact one another to iron out the details or if they prefer the system may facilitate the rest of the interaction.

Figure 8:
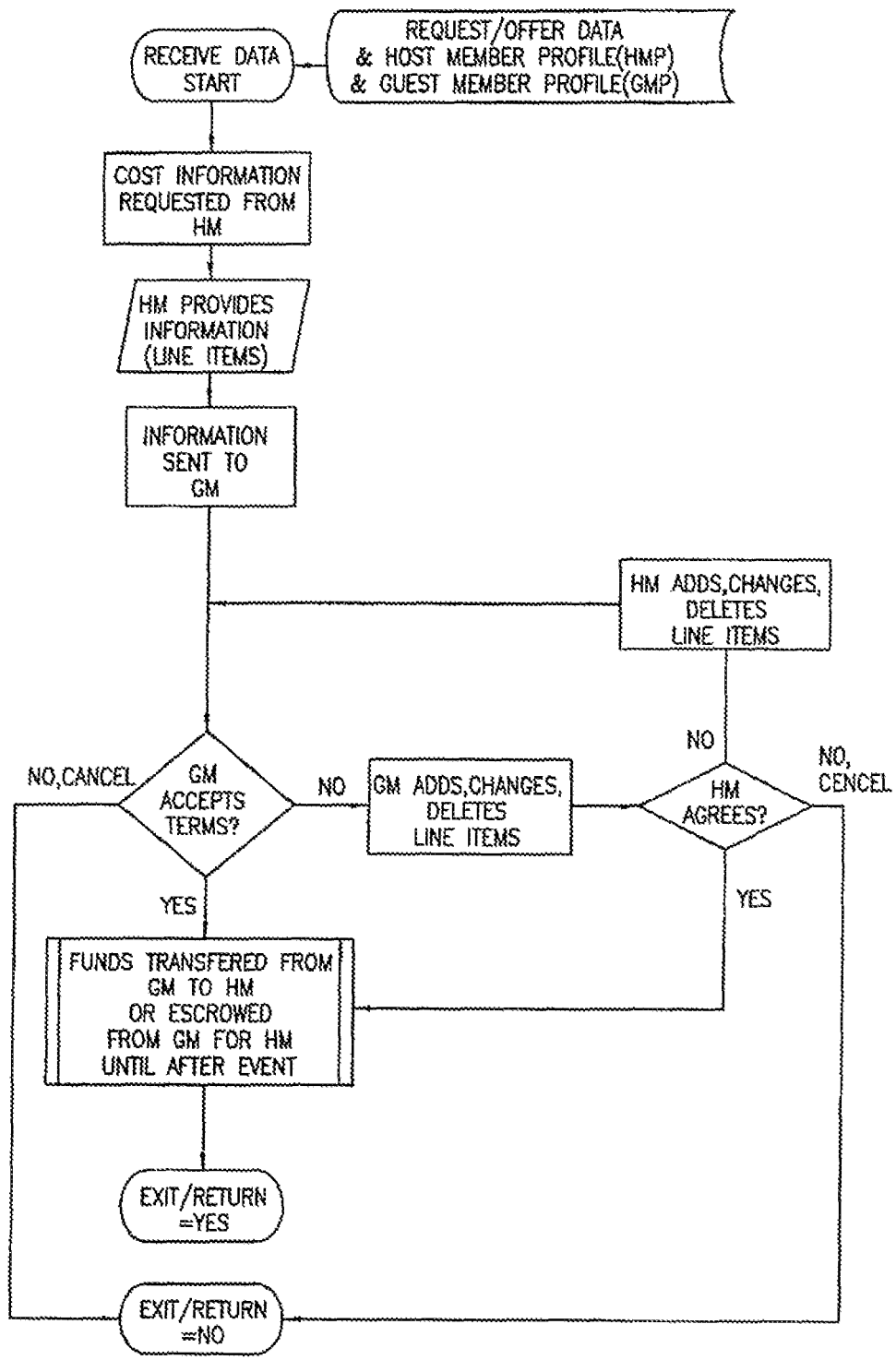
FIG. 8 is a flow chart illustrating a general overview of settling interaction costs between members according to an eighth exemplary embodiment of the present invention.

V. Payment:

Members may be discouraged from seeking monetary remuneration exceeding the costs actually incurred by either party. If an exchange of funds is required for whatever reason the members may choose to handle it between themselves or may request that the system facilitate the process. Referring to FIG. 8, the system may collect funds from the appropriate parties either directly or through a third party and release them or instruct a third party to release them based on agreed-upon criteria.

VI. Ratings

Figure 9:
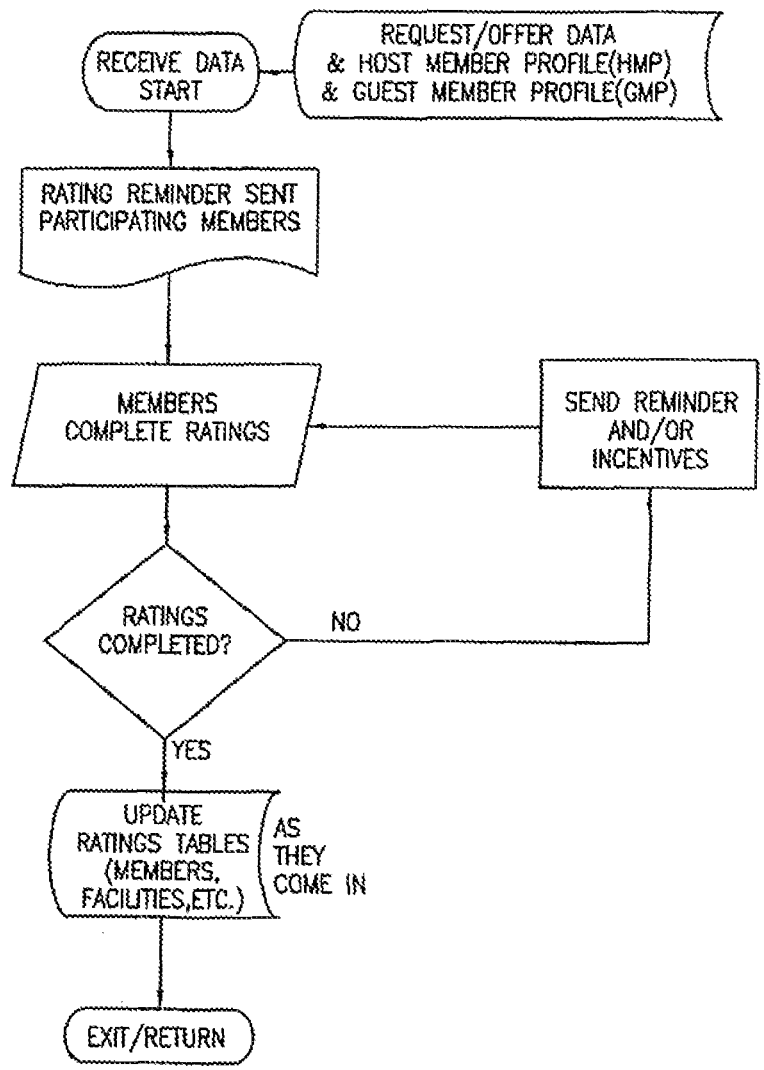
FIG. 9 is a flow chart illustrating a general overview of rating members according to a ninth exemplary embodiment of the present invention.

Referring to FIG. 9, each of the participants may be asked to "rate" their experience. These ratings may include all aspects of their experience. Once completed these ratings may be publicly available to other members or viewable under certain circumstances. In order to prompt member participation a new request may require both members to rate their last experience, or some other form of enticement may be used.

Each step of this process may be archived in the databases and available in case of member complaints, questions and/or for data mining in searches for trends and patterns in member behavior among other things.

Components

Figure 10:
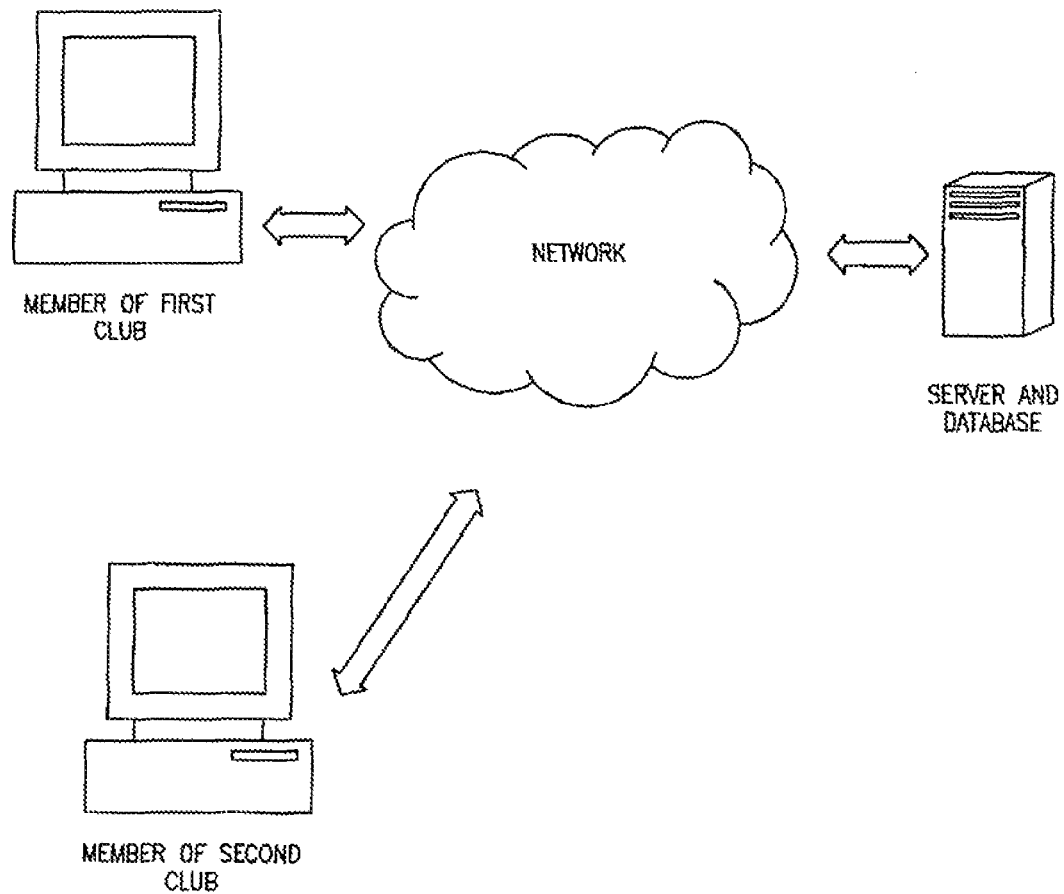
FIG. 10 is a exemplary diagram of components for processing interaction between members according to a tenth exemplary embodiment of the present invention.

Architecturally, aspects of the invention can be located on a server, workstation, minicomputer, or mainframe as shown in FIG. 10. A central server or group of servers may accomplish the processing and storage of data. Members may access the server and databases of information via networks, for example, the Internet. Members may log into the server from remote personal computers to receive and transmit data. Aspects of the system may be implemented at the server, member computer, or combination of both.

The systems and methods may be incorporated in software used with a computer or other suitable operating device. The software stored or loaded in the memory may include one or more separate programs, each of which comprises an ordered listing of executable instructions for implementing the methods and systems of the invention. The software may work in conjunction with an operating system and/or browser or email application. The operating system essentially controls the execution of the computer programs. The system and method may be implement by software stored within the memory of the computer running the operating system. The browser or email application controls the transmission and receive of information. The system or method may be implemented by an application executed by either a browser or email application or other remote application. For example, the system or method may also be implemented on a remote server that provides an email protocol that transmits information to and from user via email or website. The system and method may also include a Graphic User Interface (GUI) to allow the administrator or members to interact with the system.

Persons skilled in the art will appreciate that the present invention can be practiced by other than the described examples and embodiments, which are presented for purposes of illustration rather than of limitation and that the present invention is limited only by the claims that follow.

What is claimed is:

1. A computer implemented method of facilitating interactions between individuals, comprising the acts of:
   receiving a request from a first member of a first organization to be matched to one or more members of an organization other than his own;
   identifying a list of potential recipients for information provided by the first member of the first organization, wherein identifying the list of potential recipients includes matching one or more recipients based upon a first member's filter system, wherein the first member's filter system includes:
      at least one base preference table comprising information drawn from a member profile of the first member,
      at least one inclusion table provided by the first member with the request, and
      at least one exclusion table provided by the first member with the request,
   wherein the at least one inclusion table and the at least one exclusion table take precedence over the base preference table when a conflict exists between the at least one base preference table and the one or more inclusion and exclusion tables;
   matching the first member's information to one or more other members of one or more other organizations based upon the one or more other member's filter systems, wherein the other member's filter systems includes at least one base preference table comprising information drawn from a member profile of the one or more other members, and wherein the one or more members of the one or more other organizations are not members of the first organization;
   providing the first member's information to the other members when the first member's and the other members' filtering systems indicate a match, wherein the identity of the other members are kept anonymous from the first member; and
   receiving responses from one or more other members indicating approval of the first members request;
   wherein each response comprises transmitting an invitation to the first member to communicate with the corresponding one of the one or more other members indicating approval of the first members request, and
   wherein the invitation includes the identity of the respective one or more other member, and
   wherein the first organization and the one or more other organizations each independently limit access to individuals who have satisfied membership requirements or are guests of individuals who have satisfied membership requirements.

2. The method of facilitating interactions of claim 1, comprising the acts of:
   listing other members on one of an inclusive list and exclusive list.

3. The method of facilitating interactions of claim 1, comprising the acts of:
   receiving a rating of the interaction by the one or more members of the other organizations and receiving a rating of the interaction by the member of the first organization.

4. The method of facilitating interactions of claim 1, wherein the member of the first organization is matched with the one or more members of the other organizations based exclusively on membership of a particular organization.

5. The method of facilitating interactions of claim 1, further comprising the actions of:
   transferring funds between at least one of 1) accounts of members, and 2) third parties.

6. The method of facilitating interactions of claim 1, wherein the actions are carried out via a web portal.

7. The method of facilitating interactions of claim 1, wherein the base preference table further comprises a calendar for the first member and for each of the one or more other members.

* * * * *